US012637084B2

(12) United States Patent (10) Patent No.: US 12,637,084 B2
Crump et al. (45) Date of Patent: May 26, 2026

(54) METHOD FOR DETERMINING A ROAD FRICTION VALUE

(71) Applicant: Magna PT B.V. & Co. KG, Untergruppenbach (DE)

(72) Inventors: Sebastian Crump, Munich (DE); Sören Wenzel, Schefflenz (DE)

(73) Assignee: Magna PT B. V. & Co. KG, Untergruppenbach (DE)

( * ) Notice: Subject to any disclaimer, the term of this patent is extended or adjusted under 35 U.S.C. 154(b) by 275 days.

(21) Appl. No.: 18/709,886

(22) PCT Filed: Sep. 15, 2022

(86) PCT No.: PCT/EP2022/075687
§ 371 (c)(1),
(2) Date: May 14, 2024

(87) PCT Pub. No.: WO2023/083515
PCT Pub. Date: May 19, 2023

(65) Prior Publication Data
US 2025/0018952 A1 Jan. 16, 2025

(30) Foreign Application Priority Data

Nov. 15, 2021 (DE) ..................... 10 2021 212 792.4

(51) Int. Cl.
B60W 40/068 (2012.01)
B60T 8/172 (2006.01)
B60T 8/1763 (2006.01)
(52) U.S. Cl.
CPC ........... B60W 40/068 (2013.01); B60T 8/172 (2013.01); B60T 8/17636 (2013.01);
(Continued)

(58) Field of Classification Search
CPC .. B60T 8/17636; B60T 8/172; B60T 2210/12; B60T 2240/02; B60T 2240/04;
(Continued)

(56) References Cited

U.S. PATENT DOCUMENTS

| | | | | |
|---|---|---|---|---|
| 11,897,479 | B2 * | 2/2024 | Beal | B60W 40/068 |
| 11,975,725 | B2 * | 5/2024 | Thompson | G08G 1/16 |

(Continued)

FOREIGN PATENT DOCUMENTS

| | | |
|---|---|---|
| DE | 102004053880 A1 | 5/2006 |
| DE | 102012217772 A1 | 4/2014 |

(Continued)

OTHER PUBLICATIONS

European Patent Office, Rijswijk, Netherlands, International Search Report of International Application No. PCT/EP2022/075687, Mailed Jan. 27, 2023, 2 pages.

*Primary Examiner* — Peter J Macchiarolo
*Assistant Examiner* — Monica S Young
(74) *Attorney, Agent, or Firm* — Dickinson Wright PLLC

(57) ABSTRACT

A method for determining a current road friction value ($\mu_{road}$) using a control device in a motor vehicle continuously calculates a current friction value demand ($\mu_{dem}$) by the control device. A current tire stiffness (St) is determined from the calculated current friction value demand ($\mu_{dem}$) and a current tire slip (Slip), and the current road friction value ($\mu_{road}$) is determined from the current tire stiffness (St) by way of a stored table (T), which maps tire stiffnesses (St) to road friction values ($\mu_{road}$).

15 Claims, 4 Drawing Sheets

(52) U.S. Cl.
     CPC ....... *B60T 2210/12* (2013.01); *B60T 2240/02*
          (2013.01); *B60T 2240/04* (2013.01); *B60W*
          *2520/26* (2013.01); *B60W 2552/40* (2020.02)

(58) Field of Classification Search
     CPC .......... B60W 40/068; B60W 2552/40; B60W
                                                 2520/26
     USPC ............................................................. 73/9
     See application file for complete search history.

(56)                    References Cited

U.S. PATENT DOCUMENTS

| | | | | |
|---|---|---|---|---|
| 12,134,391 B2 * | 11/2024 | Nouri | .................... | B60W 40/12 |
| 12,162,494 B2 * | 12/2024 | Ghandriz | ........ | B60W 30/18172 |
| 2012/0179327 A1 * | 7/2012 | Yngve | ............... | B60W 40/064 |
| | | | | 701/32.9 |
| 2015/0284006 A1 * | 10/2015 | Singh | ................. | B60W 40/068 |
| | | | | 702/41 |
| 2016/0368503 A1 * | 12/2016 | Jonasson | ............... | B60R 16/023 |
| 2018/0319404 A1 * | 11/2018 | Jonasson | ............... | B60W 10/18 |
| 2020/0290625 A1 * | 9/2020 | Berntorp | ......... | B60W 30/18172 |

FOREIGN PATENT DOCUMENTS

| | | | | | | |
|---|---|---|---|---|---|---|
| DE | 102019117981 A1 | * | 1/2021 | ......... | B60W 40/068 |
| DE | 102020200161 B3 | * | 1/2021 | ............ | B60W 40/13 |
| EP | 2572947 A1 | | 3/2013 | | |
| EP | 2927065 A1 | | 10/2015 | | |
| EP | 3106360 A1 | | 12/2016 | | |
| EP | 3398825 A1 | | 11/2018 | | |

* cited by examiner

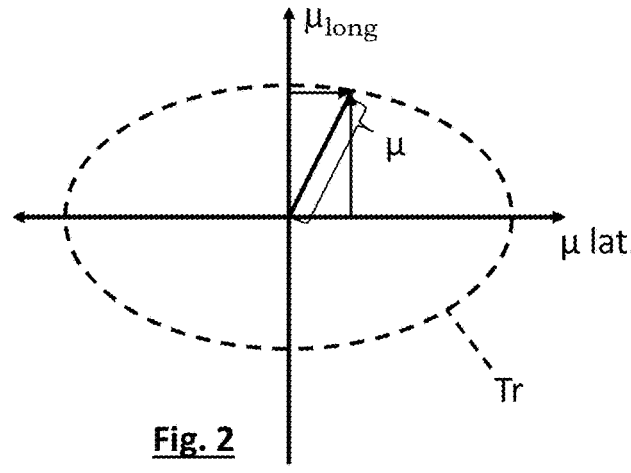
Fig. 2
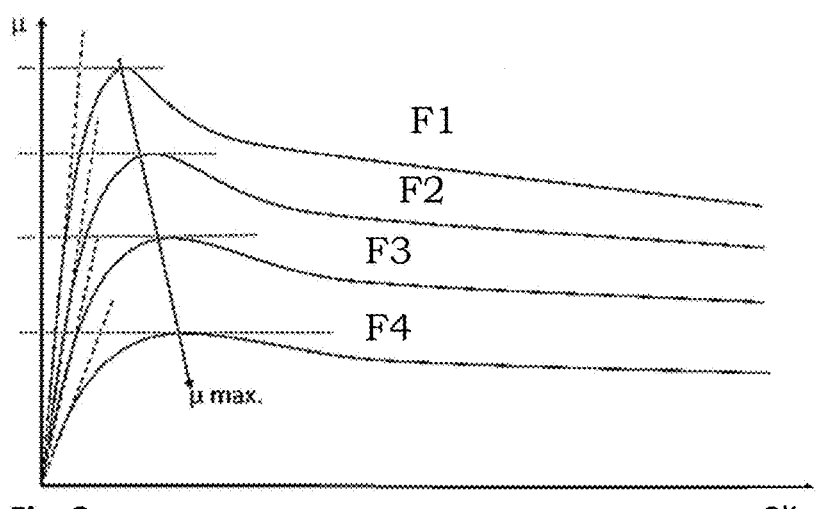
Fig. 3                                                                 Slip
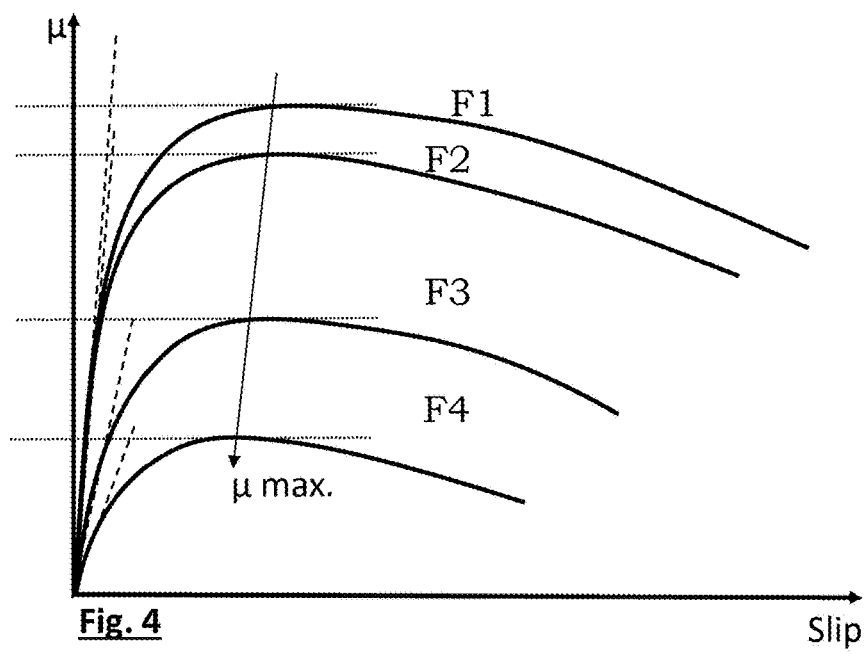
Fig. 4                                                                 Slip

METHOD FOR DETERMINING A ROAD FRICTION VALUE

CROSS-REFERENCE TO RELATED APPLICATIONS

This application claims priority to PCT/EP2022/075687 filed Sep. 15, 2022. The entire disclosure of the above application is incorporated herein by reference.

FIELD

The present disclosure relates to a method for determining a current road friction value by a control unit in a motor vehicle.

BACKGROUND

This section provides information related to the present disclosure which is not necessarily prior art.

It is already known that control units in motor vehicles are set up to determine the current friction value of the road surface being travelled on in order to be able to operate the motor vehicle more efficiently. For example, speeds and braking distances, especially those of autonomously operated vehicles, can be better adapted to the road conditions. It can also prevent the occurrence of overspeeding in a driving electric machine.

For example, DE 10 2020 200 161 B3 discloses a method including the following steps for protection against overspeeding of an electric motor in a hybrid motor vehicle powertrain with at least one axle that can be driven at least partially by the electric motor:

- estimation of a motor vehicle weight during a start-up process,
- continuous calculation of a dynamic axle load of the driven axle, a driving wheel torque and a friction value demand,
- detection of a loss of traction by way of the detection of a micro-slip between a driving axle and a non-driven axle,
- estimation of a current road friction value based on the driving wheel torque calculated at the time of loss of traction and the dynamic axle load of the driven axle calculated at loss of traction,
- maintaining the estimated road friction value until the loss of traction is no longer detected and at the same time
- determination of a maximum speed of the electric motor at which it is effectively decoupled from the drive train, based on the determined road friction value and the current load of the internal combustion engine.

In the context of a method according to DE 10 2020 200 161 B3, an estimate of a current road friction value can only be made in the event of a loss of traction, i.e. in a situation in which the wheel grip breaks off and the wheel(s) of the motor vehicle no longer provide the necessary traction and are spinning.

However, especially when driving in higher gears and with low wheel torques, there is only a low friction value demand, so that there is usually no loss of traction.

SUMMARY

This section provides a general summary of the disclosure, and is not a comprehensive disclosure of its full scope or all of its features.

It is an object of the present disclosure to specify a method for determining a current road friction value by a control unit in a motor vehicle, which also allows a determination of a current road friction value when there is no loss of traction.

The object is achieved by a method for determining a current road friction value by a control unit in a motor vehicle, wherein a current friction value demand is continuously calculated by the control unit, wherein a current tire stiffness is determined from the calculated current friction value demand and a current tire slip, and the current road friction value is determined from the current tire stiffness by way of a stored table that maps tire stiffnesses to road friction values.

According to the present disclosure, a friction value demand is thus continuously determined. In particular, the current friction value demand can be calculated from a current driving wheel torque and a currently prevailing axle load. In order to determine the road friction value, however, a loss of traction is not awaited, but the current tire stiffness is determined from the friction value demand and also information about the current tire slip. This tire stiffness is then mapped to the current road friction value by way of a table.

This means that the current road friction value can also be determined approximately between loss of traction events.

To do this, the method calculates the tire stiffness in normal driving situations and classifies this stiffness using table data that assigns a friction value to a tire stiffness.

The table data can be adapted to different road surfaces and conditions every time the wheels spin, i.e. when the wheels break away.

To achieve greater accuracy in the calculation of the tire stiffness, a statistical algorithm can be used to form an average over the last n cyclical calculations of tire stiffness.

Preferably, the current tire stiffness is determined as a statistical mean value, which takes into account a number of previously calculated current friction value demands and current tire slippage.

For example, tire stiffness can be calculated using the formula:

$$\text{Stiffness} = \frac{\sum_{i=1}^{n} \frac{\mu_n + \mu_{n+1}}{2}}{\sum_{i=100}^{n} \frac{\text{Slip}_n + \text{Slip}_{n+1}}{2}}$$

Preferably, when determining the current tire stiffness as a statistical mean value, only previously calculated current friction value demands and current tire slips that lie within a specified maximum deviation from a mean value are taken into account.

Preferably, the stored table, which maps tire stiffnesses to road friction values, is adapted, in particular to different road surfaces and conditions, in the event of a loss of traction, i.e. wheel spinning.

Preferably, in the event of a loss of traction, i.e. wheel spinning, the current road friction value is determined from the current friction value demand as equal to the current friction value demand.

The determination of the friction value demand and the road friction value can be carried out as follows:

The determination can use the dynamic axle load of the driven axle, as well as the current driving wheel torque.

The calculation of the current driving wheel torque can be carried out in a control unit, based on the prevailing clutch torques and the currently engaged ratios in the associated partial gearbox as well as the torque currently supplied by the electric motor multiplied by the transmission ratio.

To calculate or estimate the currently prevailing axle loads, a dynamic vehicle longitudinal dynamics model can be permanently calculated in the responsible control unit, which estimates the current axle loads. The vehicle mass required to calculate the axle loads can be determined during each start-up process from the driving wheel torque and the measured vehicle acceleration. This is possible because the clutch is the element in the drivetrain that determines the wheel torque during the start-up process and the resulting wheel torque is precisely known in the transmission control unit. The eventual component of the electric machine in the start-up process can be regarded as largely accurate.

Now a friction value can be permanently calculated with the help of the driving wheel torque and the determined dynamic axle load. This friction value can be regarded as the friction value demand of the motor vehicle.

If a loss of traction occurs, which is characterized by an increasing micro-slip of the driving axle of the motor vehicle compared to the non-driven axle of the motor vehicle, the friction value demand is frozen in this situation. Since the friction value no longer only represents the demand of the motor vehicle, but actually wheel slip is built up, this friction value can be used as an estimated road friction value.

Preferably, in the event of a loss of traction, i.e. wheel spin, the current road friction value is determined from the current friction value demand as equal to the current friction value demand, wherein the stored table, which maps tire stiffnesses to road friction values, is also adjusted by assigning the current tire stiffness to the current road friction value, equal to the current friction value demand.

Preferably, a lateral and a longitudinal component is determined for the current road surface friction value and/or the current friction value demand.

BRIEF DESCRIPTION OF THE DRAWINGS

The drawings described herein are for illustrative purposes only of selected embodiments and not all possible implementations, and are not intended to limit the scope of the present disclosure.

FIG. 2 is a schematic representation of a longitudinal and a lateral component of a friction value.

FIG. 3 is a schematic representation of graphs of longitudinal friction values against tire slips for different road surfaces.

FIG. 4 is a schematic representation of graphs of transverse friction values against tire slips for different road surfaces.

DETAILED DESCRIPTION

Figure 1:
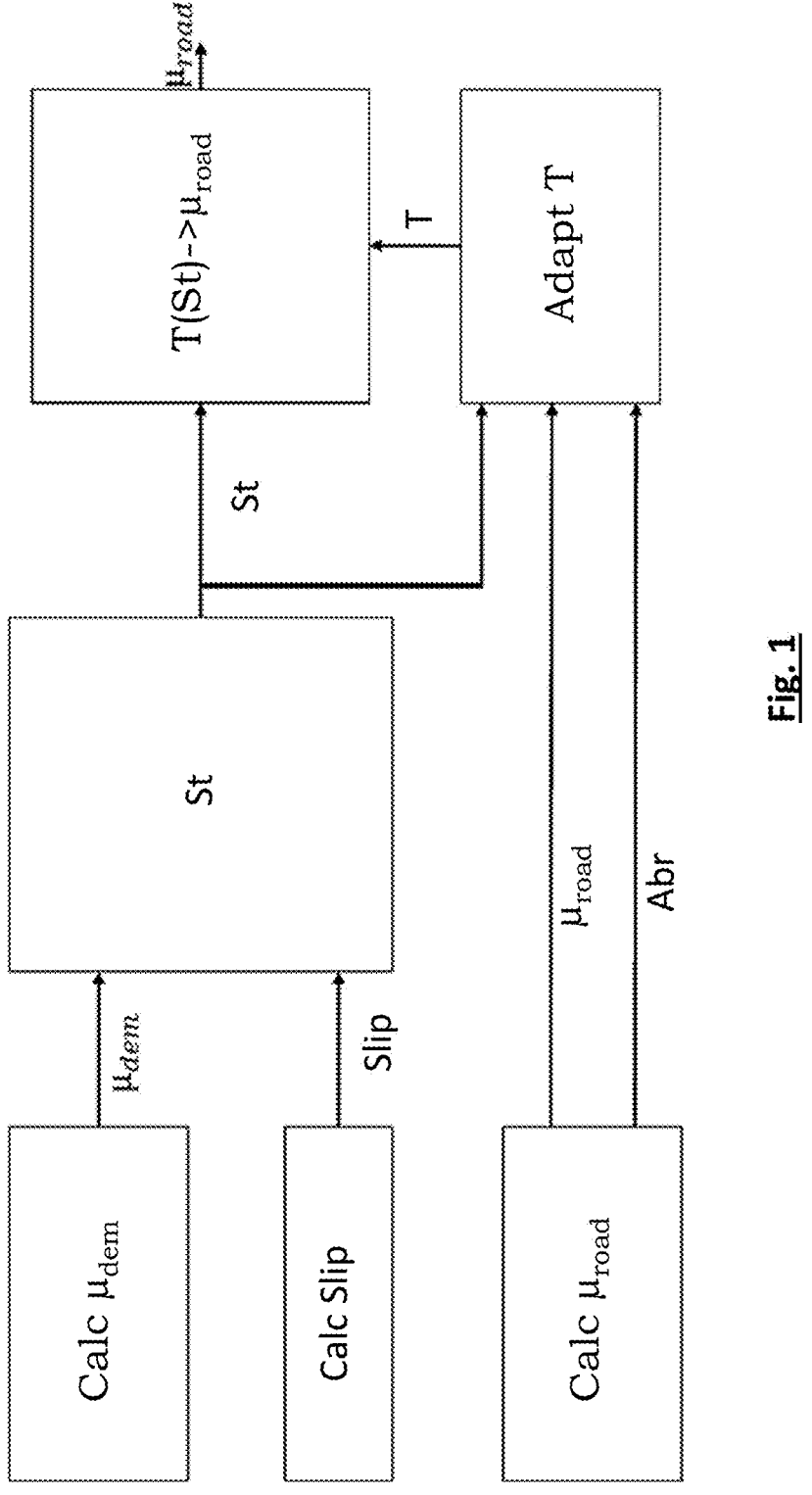
FIG. 1 is a schematic representation of a method according to the present disclosure for the determination of a current road friction value.

FIG. 1 schematically illustrates a method according to the present disclosure for the determination of a current road friction value $\mu_{road}$.

A current friction value demand $\mu_{dem}$ is continuously calculated (Calc $\mu_{dem}$ box) from a current driving wheel torque and a currently prevailing axle load.

In addition, a current tire slip is determined (Calc Slip box). A current tire stiffness St is estimated or determined from the two variables friction requirement $\mu_{dem}$ and tire slip. By way of a stored table T (St), which maps tire stiffnesses St to road friction values $\mu_{road}$, the current road friction value road is then determined from the current tire stiffness St.

The table T (St) is also adapted during the operation of the motor vehicle, so that it is a learning algorithm:

In the event of a loss of traction Abr, i.e. wheel spinning, the current road friction value road is determined from the current friction value $\mu_{dem}$, as equal to the current friction value $\mu_{dem}$ (Calc $\mu_{road}$ box). The stored table T, which maps tire stiffnesses St to road friction values $\mu_{road}$, is then adjusted by assigning the current tire stiffness St to the current road friction value $\mu_{road}$, equal to the current friction value demand $\mu_{dem}$.

FIG. 2 shows that the friction value—both the road friction value $\mu_{road}$ and the friction value demand $\mu_{dem}$—consists of a longitudinal and a lateral component. For the current road friction value $\mu_{road}$ and the current friction value demand $\mu_{dem}$, a lateral and a longitudinal component can therefore be determined separately.

FIG. 3 is a representation of various possible graphs of longitudinal friction values u against tire slip for different road surfaces, namely a dry road surface F1, a wet road surface F2, a gravel road surface F3 and a snow/ice road surface F4. For example, the tire slips Slip result from differences between the wheel speeds on the front wheels and the rear wheels. The dashed gradients are proportional to the drawn maxima and thus to the maximum road friction values $\mu_{max}$. The current gradient can be estimated in driving situations with high or low load or wheel torques. The gradient is a measure of tire stiffness St or is proportional to tire stiffness St. These graphs can therefore be used to estimate the road friction value $\mu_{road}$ not only at the maxima, i.e. in the event of a loss of traction, but also in all driving situations with a driving wheel torque.

Similarly, FIG. 4 shows graphs of lateral friction values u against tire slips Slip for the same different road surfaces, namely a dry road surface F1, a wet road surface F2, a gravel road surface F3 and a snow/ice road surface F4. Again, gradients of the respective graphs are shown and thus a measure of the tire stiffness St, as well as the maxima of the friction values u and thus corresponding road friction values $\mu_{road}$. Thus, the graphs FIG. 3 and FIG. 4 can be used to determine the longitudinal and lateral components of the road friction value $\mu_{road}$.

Figure 5:
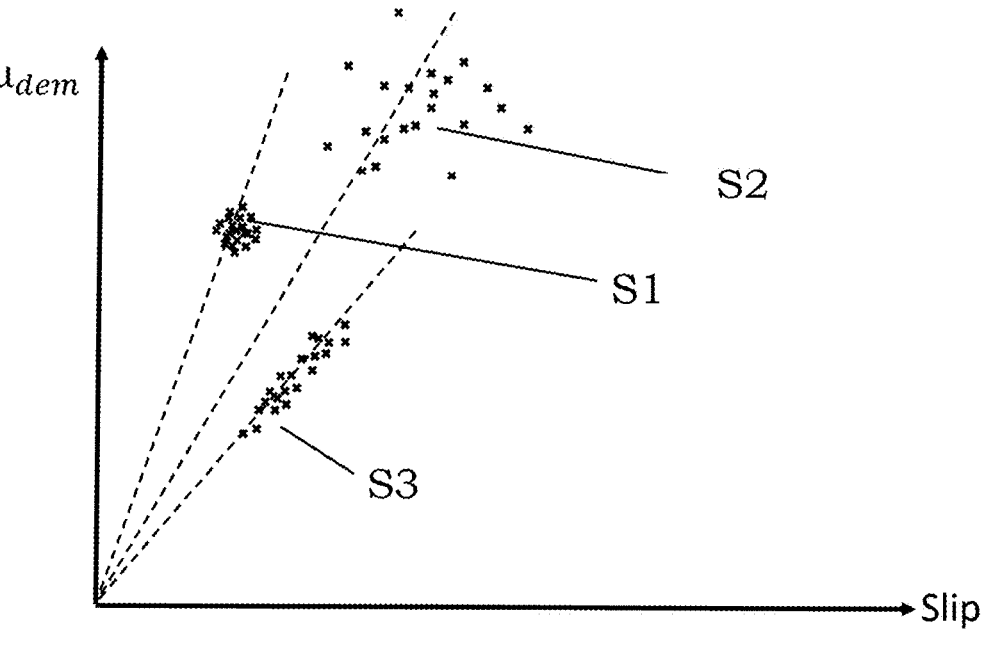
FIG. 5 is a schematic representation of data points in a coordinate system of friction value demands and tire slips and thus tire stiffnesses.

FIG. 5 shows, in a coordinate system of friction value demands $\mu_{dem}$ and tire slips, several determined data points—represented as small crosses—in different driving situations, namely when driving constantly on dry asphalt S1, when accelerating on wet asphalt S2 and when accelerating on a snow road S3. The gradient estimation (dashed line) is carried out for a statistical mean value of several determined data points (the last n data points), so that a more stable determination of the gradient and thus the tire stiffness St is carried out. Such an estimation based on the mean value of the data points also prevents discontinuous jumps of the specified road friction value $\mu_{road}$.

Figure 6:
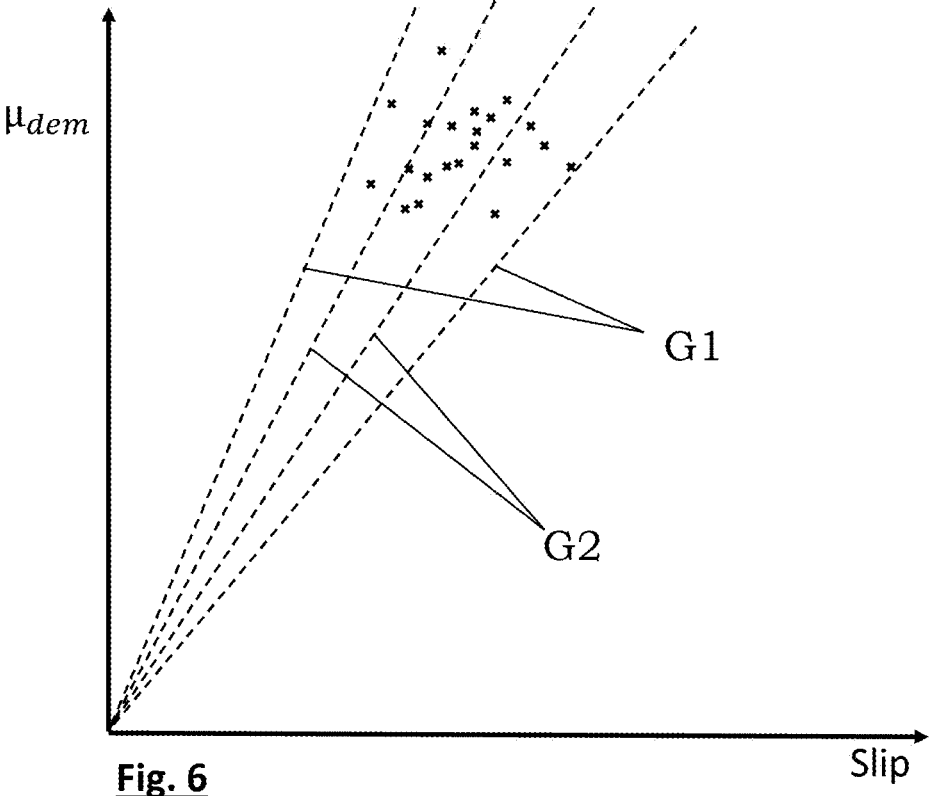
FIG. 6 is a schematic representation of data points in a coordinate system of friction value demands and tire slips and thus tire stiffnesses.

Finally, FIG. 6 shows, in the same coordinate system of friction value demands $\mu_{dem}$ and tire slips Slip of FIG. 5, that an increase in stability can also be achieved by taking into account only data points of a certain deviation from a mean value in the statistical averaging for determining the current gradient and thus the current tire stiffness St. As shown in FIG. 6, the deviation can be determined in particular by defining maximum and minimum limits for the gradients around an average gradient of the data points. FIG. 6 shows the limits G1 without deviation checking, as well as defined limits G2 for a deviation check. For determining tire stiffness, it is preferable to use only data points that are within the G2 limits for a deviation check.

Figure 8:
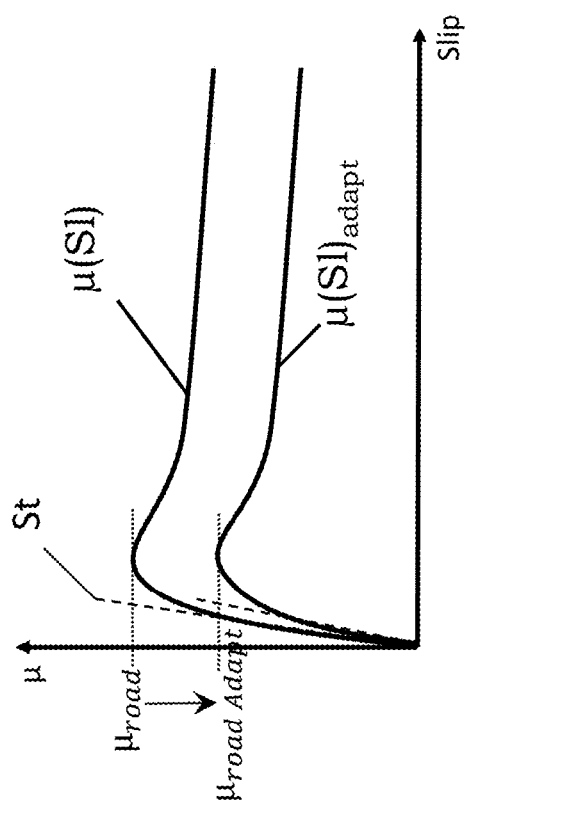
FIG. 8 is a schematic representation of the adjustment of a road friction value and a friction curve in the event of a wheel break.
Figure 7:
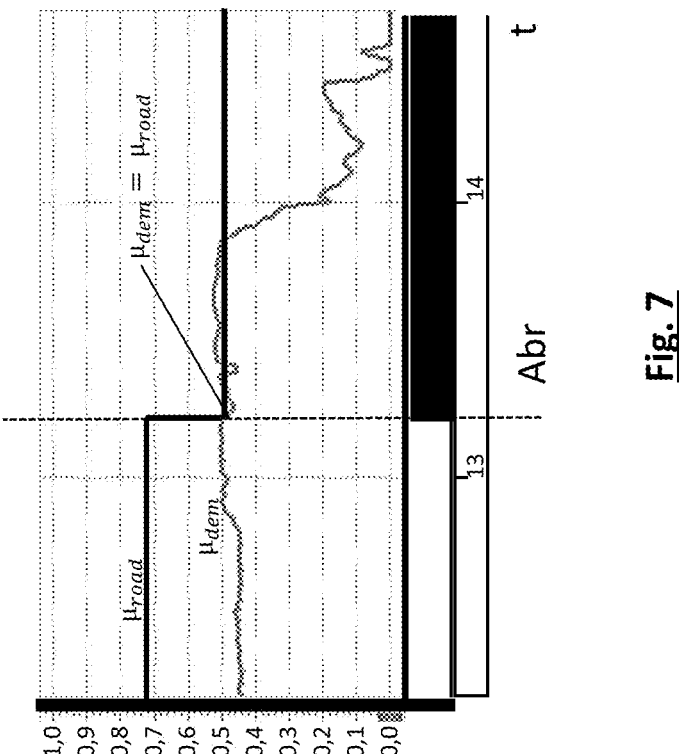
FIG. 7 is a schematic representation of a time profile of a current friction value demand around a loss of traction.

Finally, FIG. 7 shows a possible time profile (axis t) of the determined current friction value demand $\mu_{dem}$. At a certain point in time, the presence of a loss of traction Abr is detected. Prior to this time, the actual road friction value $\mu_{road}$ was higher than the current friction value demand $\mu_{dem}$. At time Abr, it is determined that the actual road friction value $\mu_{road}$ now corresponds to the current friction value demand $\mu_{dem}$. This information can now be used to adjust the road friction value $\mu_{road}$ determined by the method according to the present disclosure to the actual road friction value $\mu_{road\ Adapt}$, as shown in FIG. 8. The friction curve $\mu(SI)$ used in the method according to the present disclosure is adapted to the new friction curve $\mu(SI)_{adapt}$. The stored table T, which maps tire stiffnesses St to road friction values $\mu_{road}$, is therefore adjusted when a loss of traction Abr occurs by assigning the current tire stiffness St to the current road friction value $\mu_{road}$, equal to the current friction value demand $\mu_{dem}$.

LIST OF REFERENCE SIGNS

Abr Loss of traction
Slip Tire Slip
St Tire Stiffness
F1 Dry road
F2 Wet road
F3 Gravel Road
F4 Snow/Ice road
G1 Limits without deviation check
G2 Limits with deviation Check
S1 Driving situations: constant driving on dry asphalt
S2 Driving Situations: acceleration on wet asphalt
S3 Driving Situations: acceleration on a snow road
T Table
t Time
$\mu_{dem}$ Friction value demand
$\mu_{road}$ Road friction value
$\mu_{road\ Adapt}$ Adapted road friction value
$\mu(SI)$ Friction curve
$\mu(SI)_{adapt}$ Adapted friction curve
$\mu_{long}$ Longitudinal friction value
$\mu_{lat}$ Lateral friction value

The invention claimed is:

1. A method for determining a current road friction value by a control unit in a motor vehicle, the method comprising: continuously calculating, by the control unit, a current friction value demand from a current driving wheel torque and a currently prevailing axle load, determining a current tire stiffness from the calculated current friction value demand and a current tire slip, and determining a current road friction value from the current tire stiffness by way of a stored table, which maps tire stiffness to road friction values; wherein in the event of a loss of traction, the current road friction value is determined, from the current friction value demand, as equal to the current friction value demand.

6

2. The method as claimed in claim 1, wherein the current friction value demand is calculated from a current driving wheel torque and a currently prevailing axle load.

3. The method as claimed in claim 1, wherein the current tire stiffness is determined as a statistical mean value, which takes into account a number of previously calculated current friction value demands and current tire slips.

4. The method as claimed in claim 3, wherein, when determining the current tire stiffness as a statistical mean, only previously calculated current friction value demands and current tire slips that lie within a predetermined maximum deviation from a mean value are taken into account.

5. The method as claimed in claim 1, wherein determination of a lateral and a longitudinal component is carried out for the current road friction value and the current friction value demand.

6. The method as claimed in claim 1, wherein the loss of traction comprises wheel spinning.

7. The method as claimed in claim 1, wherein determination of a lateral and a longitudinal component is carried out for the current road friction value or the current friction value demand.

8. The method as claimed in claim 1, wherein the table includes multiple stiffness/friction relationships corresponding to different road surface types.

9. The method as claimed in claim 1, wherein multiple friction curves are stored corresponding to multiple road surfaces, such that friction values at various speeds and wheel slips are determined by adjusting one or more of the friction curves when wheel slips at other speeds are detected.

10. A method for determining a current road friction value by a control unit in a motor vehicle, the method comprising: continuously calculating, by the control unit, a current friction value demand from a current driving wheel torque and a currently prevailing axle load, determining a current tire stiffness from the calculated current friction value demand and a current tire slip, and determining a current road friction value from the current tire stiffness by way of a stored table, which maps tire stiffness to road friction values: wherein the stored table, which maps tire stiffnesses to road friction values, is adjusted in the event of a loss of traction.

11. The method as claimed in claim 10, wherein in the event of a loss of traction, wherein the loss of traction comprises wheel spin, the current road friction value is determined, from the current friction value demand, as equal to the current friction value demand, wherein the stored table, which maps tire stiffnesses to road friction values, is adjusted by assigning the current tire stiffness to the current road friction value, equal to the current friction value demand.

12. The method as claimed in claim 10, wherein the loss of traction comprises wheel spinning.

13. The method as claimed in claim 10, wherein the table is adjusted when a loss of traction occurs by assigning a current tire stiffness at the time of the loss of traction to the current friction value demand at the at the time of the loss of traction.

14. The method as claimed in claim 13, wherein the current road friction is determined to be equal to the current friction value demand at the time of the loss of traction.

15. A method for determining a current road friction value by a control unit in a motor vehicle, the method comprising: continuously calculating, by the control unit, a current friction value demand from a current driving wheel torque and a currently prevailing axle load, determining a current tire stiffness from the calculated current friction value demand and a current tire slip, and determining a current road friction value from the current tire stiffness by way of a stored table, which maps tire stiffness to road friction values; wherein at a first time, the actual road friction value is higher than the current friction value demand; at a second time, later than the first time, a loss of traction is detected; at or after the second time, determining that the actual road friction at the second time corresponds to the current friction value demand at the second time; in response thereto, adjusting the determined road friction value to the actual road friction value; adapting a friction curve of the vehicle based on the determined road friction road friction value.

\*    \*    \*    \*    \*